United States Patent [19]

Yoshida et al.

[11] Patent Number: 4,573,656
[45] Date of Patent: Mar. 4, 1986

[54] FLUID-SEALED ENGINE MOUNTING

[75] Inventors: Hiroshi Yoshida; Takefumi Toyoshima, both of Saitama; Tomio Iwabori; Hideaki Ohkura, both of Kanagawa; Yasuo Miyamoto; Izumi Nishimura, both of Saitama; Toshiyuki Oikawa, Kanagawa; Kenji Sekijima, Kanagawa; Makoto Ohashi, Kanagawa, all of Japan

[73] Assignees: Honda Giken Kogyo Kabushiki Kaisha, Tokyo; Hokushin Kogyo Kabushiki Kaisha, Yokohama, both of Japan

[21] Appl. No.: 633,324

[22] Filed: Jul. 23, 1984

[30] Foreign Application Priority Data

Jul. 22, 1983 [JP] Japan .................................. 58-134826
Feb. 20, 1984 [JP] Japan .............................. 59-23573[U]

[51] Int. Cl.⁴ ............................................. B60G 11/62
[52] U.S. Cl. ..................................... 248/562; 248/636; 267/140.1; 267/35
[58] Field of Search ............... 248/562, 566, 659, 636; 267/140.1, 141.3, 35, 141, 141.7, 141.2, 141.4, 63 A; 180/312

[56] References Cited

U.S. PATENT DOCUMENTS

| | | | |
|---|---|---|---|
| 3,140,783 | 4/1963 | Kretzmer et al. | 267/35 |
| 4,161,304 | 7/1979 | Brenner et al. | 267/35 X |
| 4,277,056 | 7/1981 | Ticks | 267/140.1 |
| 4,391,435 | 7/1983 | Pham | 248/636 X |
| 4,424,960 | 1/1984 | Dan et al. | 267/140.1 X |
| 4,483,521 | 11/1984 | Kakimoto | 248/562 X |
| 4,491,304 | 1/1985 | Kakimoto et al. | 248/562 X |
| 4,492,366 | 1/1985 | Ozawa et al. | 248/659 X |

FOREIGN PATENT DOCUMENTS

| | | | |
|---|---|---|---|
| 0040290 | 11/1981 | European Pat. Off. | 267/140.1 |
| 2621725 | 11/1977 | Fed. Rep. of Germany | 267/140.1 |
| 55-149436 | 11/1980 | Japan | 267/140.1 |
| 56-143839 | 11/1981 | Japan | 267/140.1 |
| 57-22434 | 2/1982 | Japan | 267/140.1 |
| 58-72740 | 4/1983 | Japan | 267/140.1 |

Primary Examiner—Ramon S. Britts
Assistant Examiner—Karen Chotkowski
Attorney, Agent, or Firm—Armstrong, Nikaido, Marmelstein & Kubovcik

[57] ABSTRACT

A fluid-sealed engine mounting has a connector adapted to be connected to an engine, a base adapted to be connected to a vehicle frame, an elastic member joined between the connector and the base and elastically deformable in response to vibrations transmitted thereto, the connector, the base, and the elastic member jointly defining a fluid chamber in which a fluid is sealed, and a partition dividing the fluid member into a first chamber adjacent to the connector and a second chamber adjacent to the base, the partition having an orifice through which the first and second chambers communicate with each other. The engine mounting also includes a diaphragm mounted on the base or the connector for varying the volume of one of the first and second chambers when vibrations are transmitted to the engine mounting.

10 Claims, 8 Drawing Figures

FLUID-SEALED ENGINE MOUNTING

BACKGROUND OF THE INVENTION

1. Field of the Invention

The present invention relates to a mounting for being interposed between an engine and a vehicle frame, and more particularly to the structure of a fluid-sealed engine mounting having therein a chamber in which a fluid is sealed.

2. Description of the Prior Art

One known type of fluid-seal engine mounting comprises a connector adapted to be connected to an engine, a base adapted to be connected to a vehicle frame, and an elastic member joined between the connector and the base and elastically deformable as vibrations are transmitted therethrough. The mounting has a chamber defined by the connector, base, and elastic member, with a fluid sealed in the chamber. The elastic member is composed of two upper and lower members with a partition interposed therebetween and dividing the chamber into upper and lower chambers. The partition has an orifice through which the upper and lower chambers are kept in communication with each other. Such an engine mounting is disclosed in Japanese Laid-Open Patent Publication No. 58-25843, for example. The prior engine mounting has improved dynamic characteristics achieved by the dampening of vibrations due to the movable orifice at the time the partition resonates and the dampening of vibrations due to the upper and lower elastic members. The known engine mounting has a shortcoming in that since the upper and lower chambers are of equal volumes, the vibration dampening by the orifice is accomplished only when the partition resonates. Another drawback is that because the base is in the form of a single flat plate, if a diaphragm is attached to the base, then it is difficult to connect the base to a fixed member such as the vehicle frame.

Therefore, it is an object of the present invention to provide a fluid-sealed engine mounting including a partition having an orifice which is also effective in dampening vibrations when the partition does not resonate.

Another object of the present invention is to provide a fluid-sealed engine mounting having a base that can easily be coupled to a fixed member even with a diaphragm attached to the base.

According to the present invention, there is provided a fluid-sealed engine mounting for mounting an engine on a vehicle frame, comprising a connector adapted to be connected to the engine, a base adapted to be connected to the vehicle frame, an elastic member joined between the connector and the base and elastically deformable in response to vibrations transmitted thereto, the connector, the base, and the elastic member jointly defining a fluid chamber in which a fluid is sealed, a partition dividing the fluid chamber into a first chamber adjacent to the connector and a second chamber adjacent to the base, the partition having an orifice through which the first and second chambers communicate with each other, and a diaphragm mounted on the connector or the base for varying the volume of one of said first and second chambers when vibrations are transmitted to the engine mounting.

The base comprises a tubular body having a radially outwardly projecting flange on one end thereof and a radially inwardly opening recess in an opposite end thereof. The diaphragm has a peripheral edge gripped in the radially inwardly opening recess in the base. The fluid-sealed engine mounting is connected by the flange to the vehicle frame.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
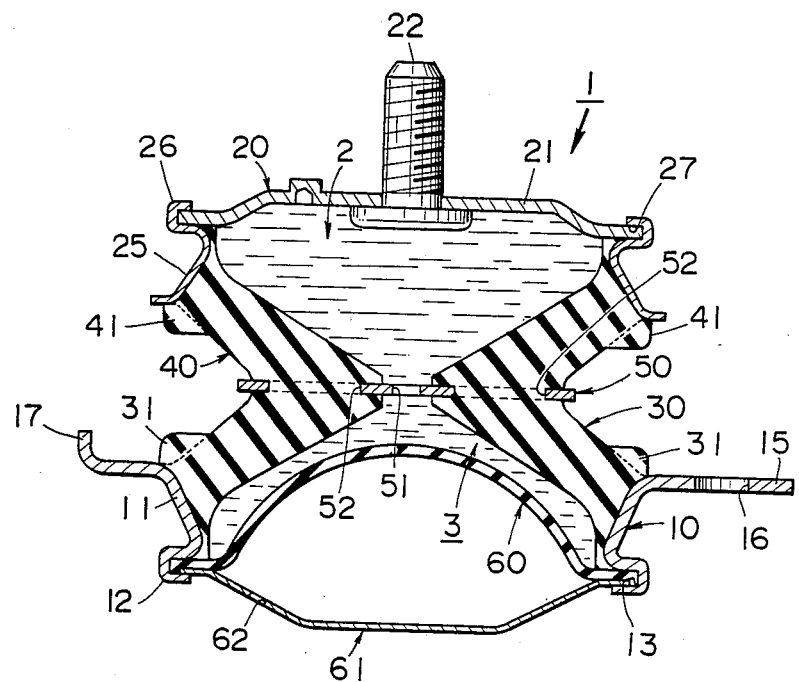
FIG. 1 is a vertical cross-sectional view of a fluid-sealed engine mounting according to a first embodiment of the present invention, the view being taken along line 1—1 of FIG. 2.
Figure 2:
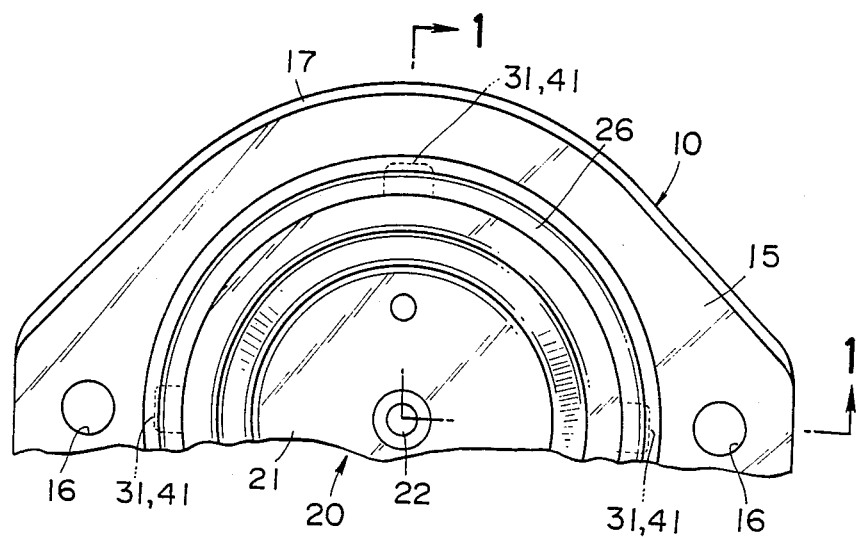
FIG. 2 is a fragmentary plan view of the fluid-sealed engine mounting of FIG. 1.

As shown in FIGS. 1 and 2, a fluid-sealed engine mounting, generally indicated by the reference numeral 1, according to a first embodiment of the present invention includes a base 10 for being fastened to a vehicle frame (not shown). The base 10 comprises an inverted, substantially frustoconical tubular or hollow cylindrical body having on an upper end (as shown in FIG. 1) thereof a radially outwardly projecting flange 15 extending fully circumferentially and in a lower end (as shown in FIG. 1) thereof a radially inwardly opening annular recess 13 of a substantially U-shaped cross section extending fully circumferentially. As illustrated in FIG. 2, the flange 15 has a pair of diametrically opposite attachment holes 16, 16 through which bolts (not shown) extend in fastening the mounting to the vehicle frame. The flange 15 has its opposite peripheral edges, one on each side of the pair of attachment bolts 16, 16, directed upwardly as a pair of lips 17 (only one shown in FIGS. 1 and 2) which serve to reinforce the flange 15.

The fluid-sealed engine mounting 1 also includes a connector 20 adapted to be coupled to an engine (not shown). The connector 20 comprises a thin circular plate 21 and a frustoconical tubular body 25 having in an upper end thereof a radially inwardly opening annular recess 27 of a substantially U-shaped cross section extending fully circumferentially. The circular plate 21 has a peripheral edge fitted in the annular recess 27. The circular plate 21 is securely attached to the tubular body 25 by staking and welding the upper end of the tubular body 25 to the peripheral edge of the circular plate 21. The connector 20 also has a central attachment bolt 22 projecting axially through and fixed to the circular plate 21.

An umbrella-shaped elastic member 30 is made of shearing-resistant elastomeric rubber and has its outer peripheral surface bonded, by curing, to an upper inner peripheral surface of the tubular body 11. A thin circular partition 50 has a lower end bonded by curing to an upper surface of the elastic member 30. The partition 50 has a central orifice 51 defined therethrough.

An inverted umbrella-shaped elastic member 40 which is made of shearing-resistant elastomeric rubber has a lower surface bonded by curing to an upper surface of the partition 50. The elastic member 40 also has an outer peripheral surface bonded, by curing, to a lower inner peripheral surface of the tubular body 25 and a peripheral lower surface of the circular plate 21.

A substantially semispherical diaphragm 60 has a domed portion projecting upwardly in its free state and an outer peripheral edge fitted in the annular recess 13 in the tubular body 11. A cover plate 61 has an outer peripheral edge also fitted in the annular recess 13 and held against a lower surface of the peripheral edge of the diaphragm 60. The diaphragm 60 and the cover plate 61 are firmly secured to the base 10 by staking the lower peripheral edge of the base 10 on the peripheral edge of the cover plate 61.

The circular plate 50 sandwiched between the upper and lower elastic members 30, 40 define an upper fluid chamber 2 of a larger volume and a lower diaphragm chamber 3 of a smaller volume.

The base 10, the connector 20, the elastic members 30, 40, the partition 50, the diaphragm 60, and the cover plate 61 are assembled together in substantially concentric relation. The upper and lower elastic members 30, 40 are joined integrally together through a plurality of circular apertures 52 defined through the partition 50 around the orifice 51. The lower elastic member 30 includes four integral stoppers 31 angularly equally spaced around an outer peripheral surface thereof and projecting radially outwardly from the outer peripheral surface. Likewise, the upper elastic member 40 includes four integral stoppers 41 angularly equally spaced around an outer peripheral surface thereof and projecting radially outwardly from the outer peripheral surface. The stoppers 31, 41 are vertially or axially paired and held in vertical or axial alignment in each pair. The cover plate 61 has an air vent hole 62.

A fluid such as a liquid or a gas (a liquid in the illustrated embodiment) is filled and sealed in the fluid chamber 2 and the diaphragm chamber 3 in the mounting 1.

The thin partition 50 dividing the fluid chamber 2 and the diaphragm 3 is elastically supported by the upper and lower elastic members 30, 40, so that the orifice 51 providing fluid communication between the chambers 2, 3 is floatingly supported as a movable orifice. The movable orifice can produce variable dampening forces as it moves back and forth, thus providing desired dynamic damping characteristics.

More specifically, with the lower diaphragm chamber 3 variable in volume, when there is a pressure buildup in the upper fluid chamber 2 due to vibrations transmitted from the engine, the fluid is displaced from the fluid chamber 2 through the movable orifice 51 into the diaphragm 3. Such a fluid flow through the orifice 51 can dampen the vibrations from the engine, and also allows the elastic members 30, 40 themselves to dampen the vibrations not only when the partition 50 resonates.

If the elastic members 30, 40 are relatively less elastic, dampening forces are generated by a fluid flow through the orifice 51 so that the overall mounting 1 is rendered soft and hence durable.

Since the base 10 has the radially outward attachment flange 15 with the diaphragm 60 retained in position by the annular recess 13 remotely from the flange 15, the base 10 can easily be fastened to the vehicle frame by bolts extending through the attachment holes 16 in the flange 15.

Figure 3:
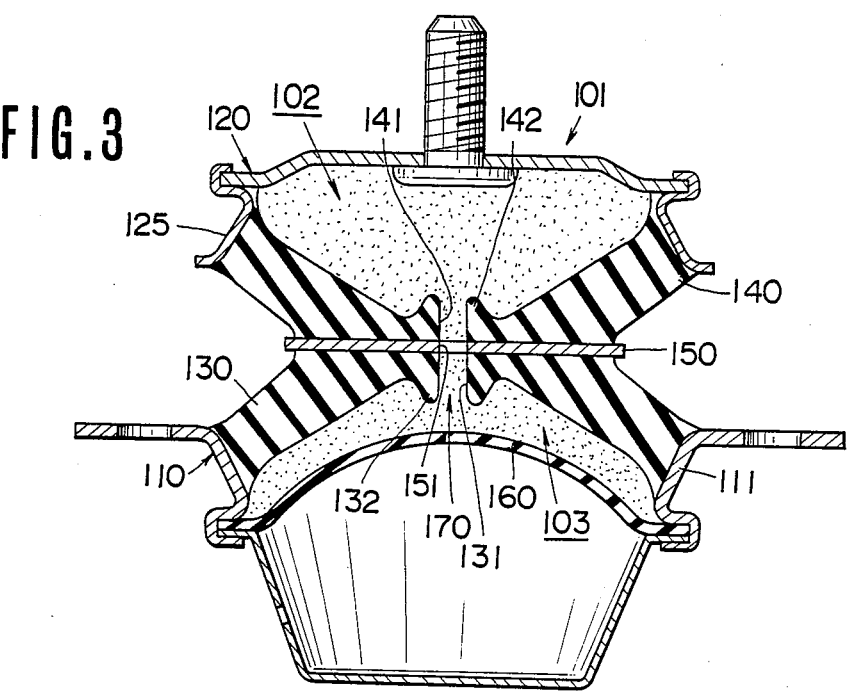
FIG. 3 is a vertical cross-sectional view of a fluid-sealed engine mounting according to a second embodiment of the present invention.

FIG. 3 shows a fluid-sealed engine mounting, generally indicated at 101, in which upper and lower elastic members have central holes having the same diameter as that of an orifice defined in a partition, the central holes and the orifice being concentric with each other. With this arrangement, the length of the orifice is substantially increased to a large extent so that damping characteristics of the mounting 101 can greatly be improved without employing an additional orifice sleeve.

More specifically, the engine mounting 101 has a base 110 including a tubular body 111, a lower thick umbrella-shaped elastic member 130 of elastomeric rubber bonded by curing to an inner peripheral surface of the tubular body 111, an upper thick inverted umbrella-shaped elastic member 140 of elastomeric rubber bonded by curing to an inner peripheral surface of a tubular body 125 of a connector 120, and a thin circular partition or orifice plate 150 interposed between and bonded by curing to the upper and lower elastic members 140, 130. The orifice plate 150 has a central orifice 151. The elastic members 130, 140 have central holes 131, 141 having substantially the same diameter as that of the orifice 151 and concentric with the orifice 151. The central holes 131, 141 are defined by annular flanges 132, 142 projecting downwardly and upwardly, respectively, from inner peripheral edges of the elastic members 130, 140. The central holes 131, 141 in the elastic members 130, 140 and the orifice 151 jointly provide a long orifice 170.

The engine mounting 101 has a main fluid chamber 102 defined in the upper elastic member 140 and an auxiliary fluid chamber 103 defined in the lower elastic member 130. The fluid chambers 102, 103 are held in fluid communication with each other through the long orifice 170.

The long orifice 170 can easily be formed since it is defined at the time the elastic members 130, 140 are cured. The ratio of the orifice length to the orifice diameter should be selected to be 25 to 1 or smaller to provide a necessary damping capability in a wide vibration range, particularly in a low-frequency vibration range.

Figure 4:
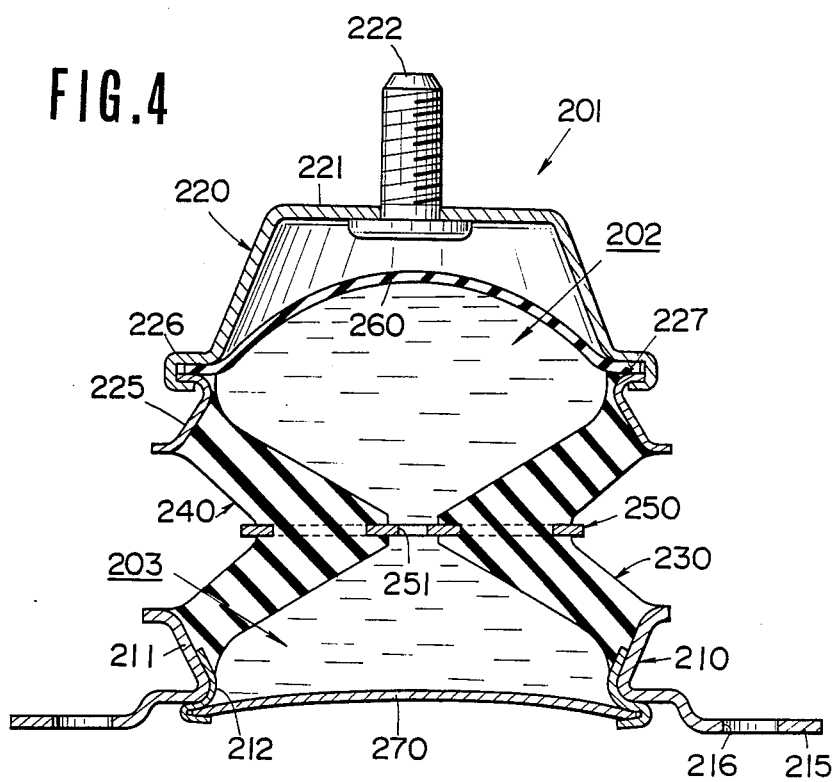
FIG. 4 is a vertical cross-sectional view of a fluid-sealed engine mounting according to a third embodiment of the present invention.

FIG. 4 illustrates a fluid-sealed engine mounting, generally designated 201, according to a second embodiment of the present invention. The engine mounting shown in FIG. 4 is designed to position a diaphragm in an upper chamber for preventing dampening forces from being reduced due to air trapped inside the mounting at the time it is manufactured or having permeated into the mounting over a long period of use. The engine mounting is of a construction which allows easy attachment thereof to a vehicle frame.

In FIG. 4, a base 210 has a radially outwardly projecting flange 215 on a lower end thereof, the flange 215 extending fully circumferentially. The base 210 also includes an inverted frustoconical tubular body 211 integral with and located radially inwardly of the flange 215. A ring member 212 supports an outer peripheral edge of a bottom plate 270 and is secured to an inner peripheral surface of the tubular body 211. The flange 215 has a pair of diametrically opposite attachment holes 216, 216 through which bolts extends to fasten the mounting 201 to a vehicle frame (not shown). A connector 220 includes an inverted cup-shaped circular member 221, a central attachment bolt 222 projecting upwardly and secured to the circular member 221, a gripping edge 226 having a radially inwardly opening annular recess 227 of a substantially U-shaped cross section and a frustoconical tubular body 225. A substantially semispherical diaphragm 260 which is domed upwardly in its free state has an outer peripheral edge inserted in the annular recess 227. The tubular member 225 has an outer peripheral flange which is also inserted in the annular recess 227 in contact with the outer peripheral edge of the diaphragm 260. The gripping edge 226 is axially staked on the outer peripheral flange of the circular member 221, so that the diaphragm 260 is firmly retained in position by the connector 220.

An upper elastic member 240 has an outer peripheral surface bonded by curing to an inner peripheral surface of the tubular body 225, and a lower elastic member 230 has an outer peripheral surface bonded by curing to an inner peripheral surface of the tubular body 211. A circular partition 250 having a central orifice 251 is bonded by curing to and between the elastic members 230, 240. The partition 250 defines an upper fluid chamber 202 and a lower fluid chamber 203 which communicate with each other through the orifice 251 in the partition 250, the fluid chambers 230, 240 being filled with a fluid.

When there is air trapped in the upper fluid chamber 202 and the mounting 201 is subjected to vibrations, any displacement of the mounting 201 acts immediately on the diaphragm 260. As the diaphragm 260 vibrates, a portion of the fluid in the upper fluid chamber 202 is displaced through the orifice 251 into the lower fluid chamber 203. Pressure variations developed in the fluid chambers are therefore not absorbed by air contained therein, and hence dampening forces will not be reduced by trapped air.

Since the flange 215 to be attached to the vehicle frame is disposed at the lower end of the base 210, the flange 215 can easily be mounted on the vehicle frame without the need for any additional attachment.

Figure 5:
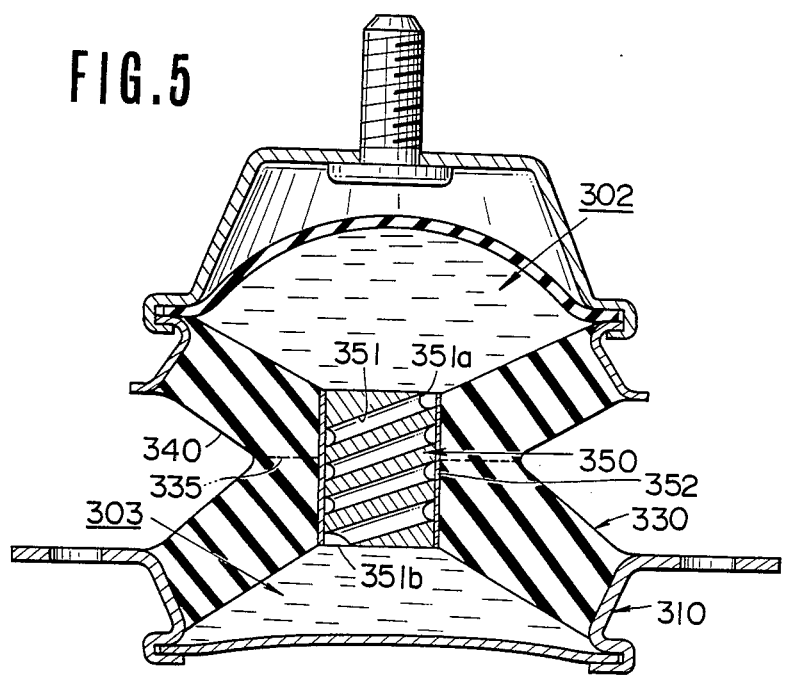
FIG. 5 is a vertical cross-sectional view of a fluid-sealed engine mounting according to a fourth embodiment of the present invention.

FIG. 5 is illustrative of a fluid-sealed engine mounting according to a fourth embodiment. According to the fourth embodiment, a tubular partition having a helical orifice groove is disposed between upper and lower fluid chambers to provide an increased orifice length for a better damping capability.

Elastic members 330, 340 are joined integrally together across their mating surface 335 and have an inner peripheral surface to which an outer peripheral surface of a tubular sleeve 352 is bonded by curing. A cylindrical partition 350 made of synthetic resin or metal is force-fitted in the sleeve 352, the cylindrical partition 350 having a helical orifice groove 351 defined in an outer peripheral surface thereof. The helical orifice groove 351 has one end 351a opening into an upper fluid chamber 302 and an opposite end 351b opening into a lower fluid chamber 303.

Composite fluid-sealed engine mountings having two fluid chambers defined by two umbrella-shaped elastic members produce vibration-dampening forces based on resonance of a fluid sealed in the two fluid chambers. Therefore, it is generally difficult for such composite fluid-sealed engine mountings to generate high vibration-dampening forces in a desired wide vibration frequency range (5 through 15 Hz) especially where the orifice has such a length as shown in FIGS. 1 and 4.

With the construction of FIG. 5, the helical orifice groove 351 is sufficiently long to generate required dampening forces. Vibration-dampening forces can be achieved in a desired vibration frequency range by selecting an axial length of the cylindrical body 350 having the helical orifice groove 351 or the number of turns of the helical orifice groove 351 and a radius of the cross-sectional shape of the helical orifice groove 351. A base 310 is of the same construction as that of the base 10 shown in FIG. 1, but may be of the same construction as that of the base 210 shown in FIG. 4.

Figure 6:
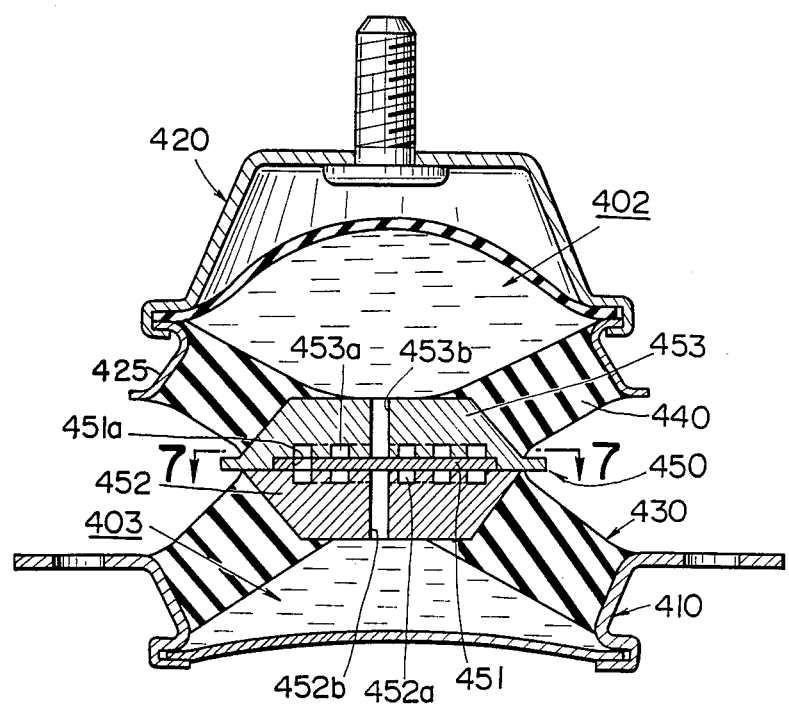
FIG. 6 is a vertical cross-sectional view of a fluid-sealed engine mounting according to a fifth embodiment of the present invention.
Figure 7:
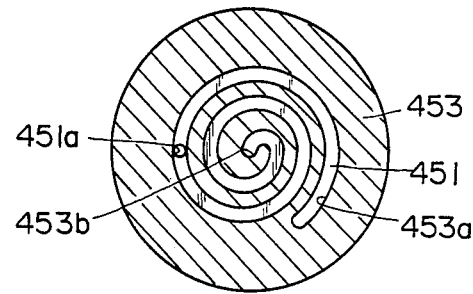
FIG. 7 is a cross-sectional view taken along line 7—7 of FIG. 6.

FIGS. 6 and 7 illustrate a fluid-sealed engine mounting including a partition having a spiral orifice groove for generating increased vibration-dampening forces in a wide vibration frequency range.

As shown in FIG. 6, an elastic member 430 has a lower or outer peripheral surface bonded by curing to an inner peripheral surface of a base 410 and an upper or inner peripheral surface to which there is bonded by curing an outer peripheral surface of an inverted frustoconical partition half member 452 made of synthetic resin such as nylon or light metal such as aluminum. The partition half member 452 has a spiral groove 452a defined in an upper surface thereof. An elastic member 440 has an upper or outer peripheral surface bonded by curing to an inner peripheral surface of a tubular body 425 of a connector 420. The elastic member 440 has a lower or inner peripheral surface bonded by curing to an outer peripheral surface of a frustonocal partition half member 453 which is of substantially the mirror image of the partition half member 452 and of the same material as that of the partition half member 452. As illustrated in FIG. 7, the partition half member 453 has a spiral groove 453a defined in a lower surface thereof in substantially coextensive relation to the spiral groove 452a in the partition half member 452. The spiral grooves 452a, 453a communicate respectively with lower and upper fluid chambers 403, 402 through holes 452b, 453b defined axially through the partition half members 452, 453, respectively. A shield plate 451 made of a light material similar to that of the partition half members 452, 453 is sandwiched therebetween to prevent the spiral grooves 452a, 453a from communicating with each other over their entire length, but allow them to communicate with each other only through a communiation hole 451a defined in the shield plate 451. In the illustrated embodiment, the partition half members 452, 453 and the shield plate 451 jointly serve as a partition 450.

With the arrangement shown in FIGS. 6 and 7, the orifice which provides fluid communication between the upper and lower fluid chambers 402, 403 has a sufficient length, which can freely be changed by employing a shield plate 451 having a communication hole 451a defined at a different position. The axial dimension of the partition 450 can be smaller than that of the partition 350 shown in FIG. 5.

Figure 8:
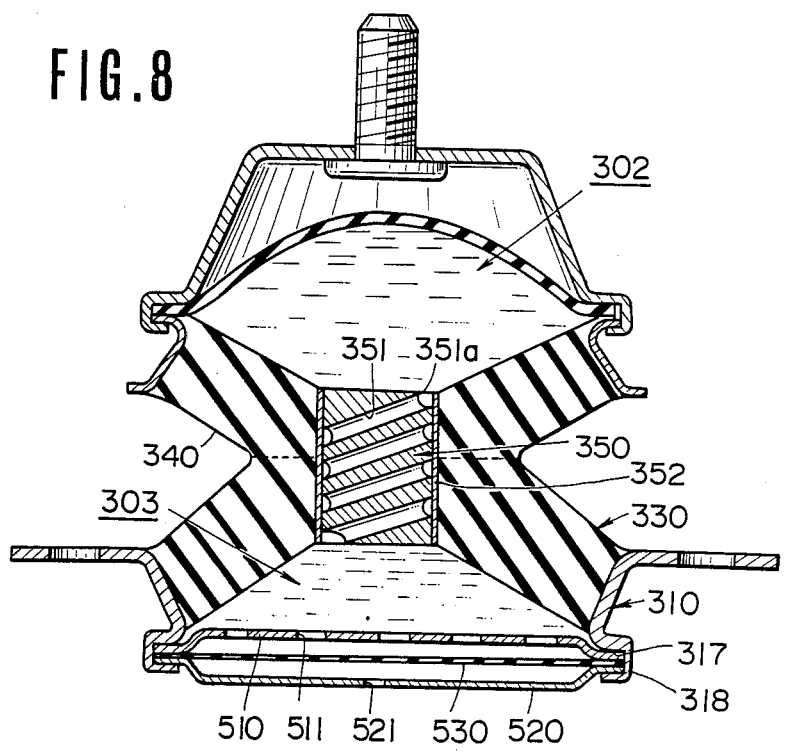
FIG. 8 is a vertical cross-sectional view of a modified fluid-sealed engine mounting.

FIG. 8 shows a modification of the fluid-sealed engine mounting illustrated in FIG. 5.

Increased damping forces achieved by the elongated orifice in the form of the helical or spiral orifice groove tend to result in increased dynamic spring characteristics. To cope with this problem, the modified enging mounting has a diaphragm for taking up a fluid pressure developed in the lower fluid chamber due to small vibrations, thereby achieving a construction for producing increased damping forces and preventing dynamic spring characteristics from being increased. Like or corresponding parts in FIG. 8 are designated by like or corresponding reference characters in FIG. 5.

A base 310 has a lower gripping edge 318 having a radially inwardly opening recess 317 of a substantially U-shaped cross section. In the recess 317, there are inserted a peripheral edge of an apertured metal sheet 510 having a plurality of punched apertures 511, a peripheral edge of a cover plate 520 having a central air vent hole 521, and a peripheral edge of a diaphragm 530 sandwiched between the peripheral edges of the apertured metal sheet 510 and the cover plate 520. The aperture metal sheet 510, the cover plate 520, and the disphragm 530 are secured to the base 310 by staking the gripping edge 318 on these members. The apertured metal sheet 510 and the cover plate 520 serve as a stopper for preventing the diaphragm 530 from being excessively deformed. The aperture metal sheet 510 may be in the form of a wire mesh of metal.

The engine mounting of the construction of FIG. 8 can produce high damping forces against vibrations in a relatively low frequency range from 5 to 5 Hz or large displacements of the mounting beyond ±1 mm, because of the long helical orifice 351. In addition, the engine mounting has low dynamic spring characteristics with respect to vibrations in a frequency range of about 20 Hz or higher or small mounting displacements below ±0.5 mm, since in that frequency range the partition 350 or the orifice 351 moves with the fluid due to pressure-absorbing movement of the diaphragm 530, thus producing no damping forces.

The orifice is not limited to a helical construction, but may be of any desired configurations provided they can generate high damping forces.

Although there have been described what are at present considered to be the preferred embodiment of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A fluid-sealed engine mounting for mounting an engine on a vehicle frame, comprising:
   (a) a connector adapted to be connected to the engine;
   (b) a base adapted to be connected to the vehicle frame;
   (c) an elastic member joined between said connector and said base and elastically deformable in response to vibrations transmitted thereto, said connector, said base and said elastic member jointly defining a fluid chamber in which a fluid is sealed;
   (d) a partition being entirely disposed intermediate said connector and said base and dividing said fluid chamber into a first chamber adjacent to said connector and a second chamber adjacent to said base, said partition having an orifice through which said first and said second chambers communicate with each other; and
   (e) a diaphragm mounted on one of said connector or said base for varying the volume of one of said first and second chambers when vibrations are transmitted to the engine mounting, said base comprises a frustoconical tubular body mounted on an end of said elastic member and having a radially outwardly projecting flange on the end thereof closer to said connector, said flange including means for attachment to the vehicle frame.

2. A fluid-sealed engine mounting according to claim 1, wherein said elastic member has a first portion defining a portion of said first chamber and a second portion defining a portion of said second chamber, said partition comprising a plate joined between said first and second portions of said elastic member, said diaphragm being mounted on said base.

3. A fluid-sealed engine mounting according to claim 2, wherein said first and second portions of said elastic member have respective holes having substantially the same diameter as that of said orifice in said partition and disposed concentrically with said orifice.

4. A fluid-sealed engine mounting according to claim 1, wherein said diaphragm is mounted on said connector.

5. A fluid-sealed engine mounting according to claim 1, wherein said partition comprises a cylindrical body having an axis aligned with an axis of the engine mounting, said orifice comprising a helical groove defined in an outer peripheral surface of said cylindrical body.

6. A fluid-sealed engine mounting according to claim 5, including a sleeve joined to an inner peripheral surface of said elastic member, said cylindrical body being forcefitted in said sleeve.

7. A fluid-sealed engine mounting for mounting an engine on a vehicle frame, comprising:
   (a) a connector adapted to be connected to the engine;
   (b) a base adapted to be connected to the vehicle frame;
   (c) an elastic member joined between said connector and said base and elastically deformable in response to vibrations transmitted thereto, said connector, said base, and said elastic member jointly defining a fluid chamber in which a fluid is sealed;
   (d) a partition comprising a circular body having an axis aligned with the axis of the engine mounting and dividing said fluid chamber into a first chamber adjacent to said connector and a second chamber adjacent to said base, said partition having an orifice comprising a spiral groove defined in said circular member and extending spirally and radially outwardly from said axis on the circular member through which said first and second chambers communicate with each other; and
   (e) a diaphragm mounted on one of said connector and said base for varying the volume of one of said first and second chambers when vibrations are transmitted to the engine mounting.

8. A fluid-sealed engine mounting according to claim 7, wherein said circular body comprises a pair of circular members having axial central through holes, respectively, said spiral groove comprising spiral groove halves defined in confronting surfaces of said circular members, said partition further including a shield plate disposed between said circular members and blocking fluid communication between said central through holes and between said spiral groove halves, said shield plate having a hole providing fluid communication between said spiral groove halves only therethrough.

9. A fluid-sealed engine mounting according to claim 1, wherein said base comprises a frustoconical tubular body mounted on an end of said elastic member and having a radially outwardly projecting flange on the end thereof closer to said connector, said flange including means for attachment to the vehicle frame, a second diaphragm defining a portion of said second chamber and having a peripheral edge joined to an end of said radially outwardly projecting flange which is remote from said connector.

10. A fluid-sealed engine mounting according to claim 9, including means for preventing said second diaphragm from being excessively deformed.

* * * * *